United States Patent [19]

Musschoot

[11] 4,258,779
[45] Mar. 31, 1981

[54] METHOD AND APPARATUS FOR CONVEYING VERY FINE SOLID MATERIAL

[75] Inventor: Albert Musschoot, Barrington, Ill.

[73] Assignee: General Kinematics Corporation, Barrington, Ill.

[21] Appl. No.: 880,462

[22] Filed: Feb. 23, 1978

Related U.S. Application Data

[63] Continuation-in-part of Ser. No. 851,611, Nov. 14, 1977, abandoned.

[51] Int. Cl.³ .......................... F28C 3/16; B65G 27/16
[52] U.S. Cl. .................................. 165/1; 165/107 R; 165/120; 198/580; 198/752; 198/617; 432/27; 432/215
[58] Field of Search ............... 198/580, 614, 617, 752; 209/44, 437, 471, 479; 432/27, 197, 215; 165/107 R, 1, 120

[56] References Cited

U.S. PATENT DOCUMENTS

| | | | |
|---|---|---|---|
| 2,078,275 | 4/1937 | Prins | 209/479 |
| 3,401,923 | 9/1968 | Bearce | 165/107 |
| 3,477,703 | 11/1969 | Tamalet | 165/107 |

Primary Examiner—Jeffrey V. Nase
Attorney, Agent, or Firm—Wegner, Stellman, McCord, Wiles & Wood

[57] ABSTRACT

The present invention provides a method and apparatus for conveying very fine material, for example, a material where 100 percent of the material is less than fifty microns in diameter, and 50 percent of the material is less than five microns in diameter. The method utilizes a vibratory conveyor, on the surface of which is formed a bed of relatively large particulate material (50 mesh or larger in diameter, for example), and the very fine particles are introduced onto the bed. Under vibratory conveying motion, the fine material filters into the interstices formed by the larger particles and thus the fine material is conveyed along with the coarser material to a point of delivery. Another aspect of the invention includes the step of separating the fine material from the particulate material and recirculating the latter. Also, the recirculating particulate material may be chilled during recirculation and thus acts as a cooling agent when reintroduced to the conveyor.

6 Claims, 2 Drawing Figures

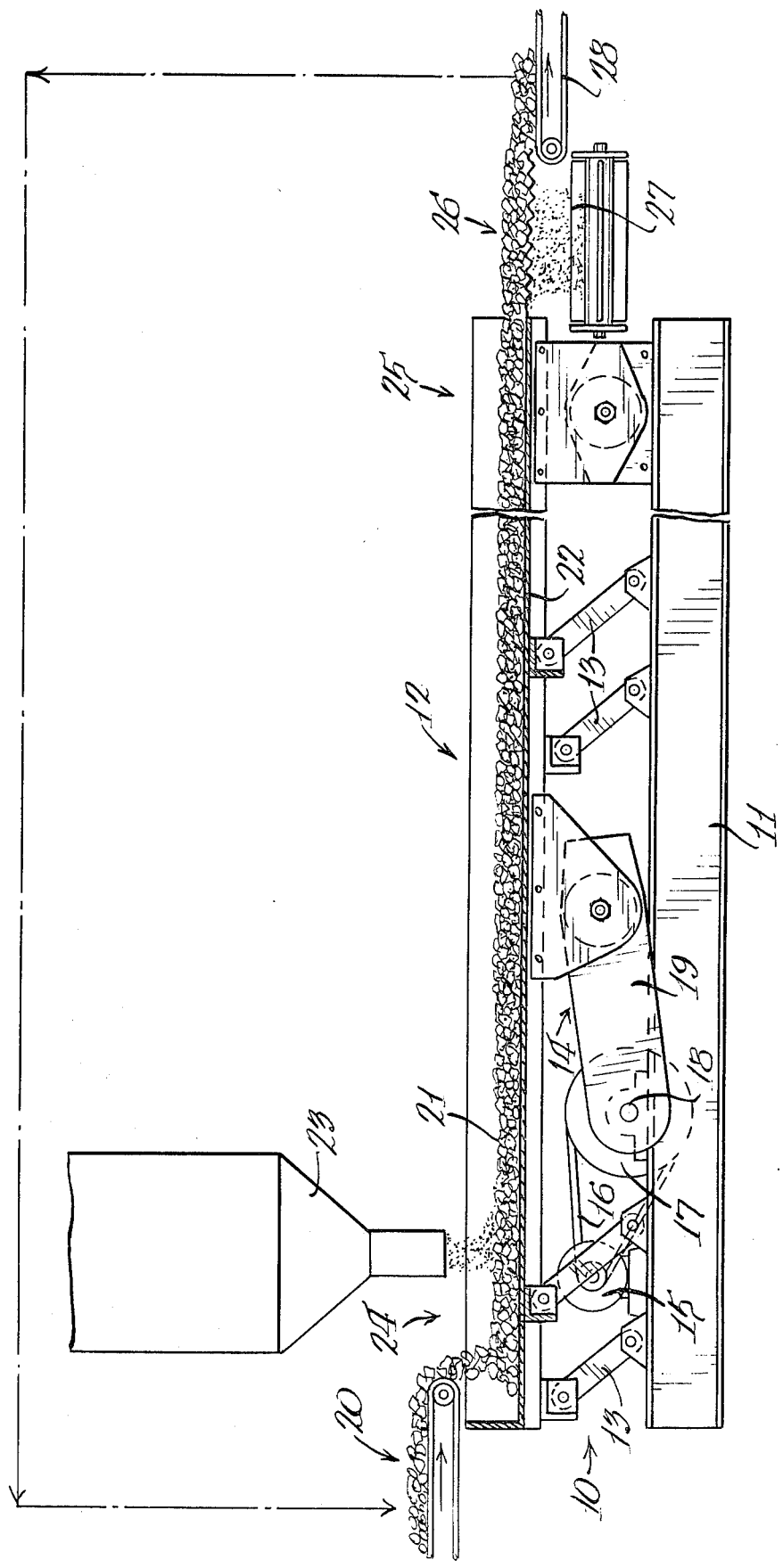

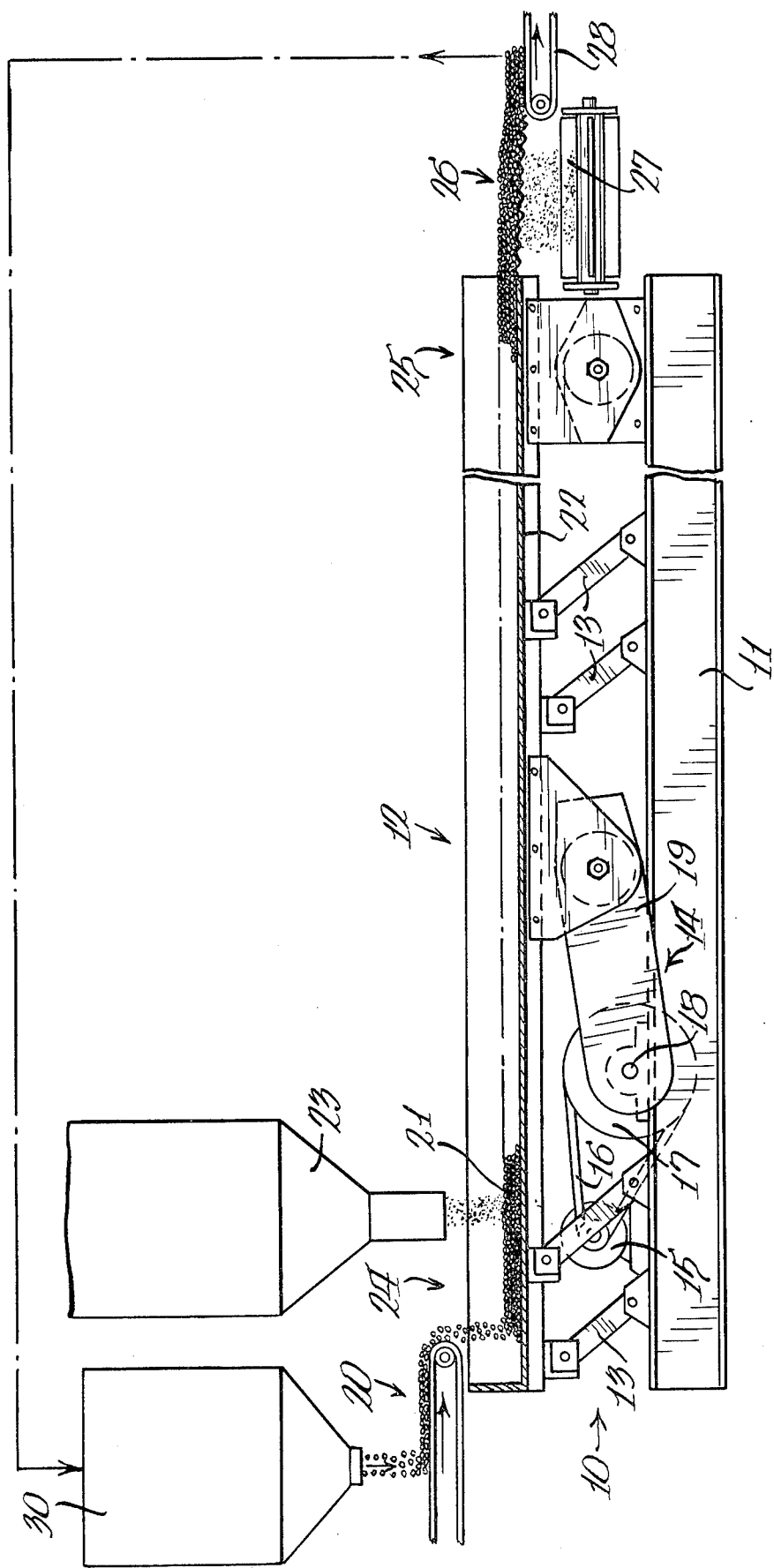

METHOD AND APPARATUS FOR CONVEYING VERY FINE SOLID MATERIAL

CROSS-REFERENCE

This application is a continuation-in-part of my co-pending application Ser. No. 851,611, filed Nov. 14, 1977, abandoned, entitled "Method and Apparatus for Conveying Fluidized Solid Material."

BACKGROUND OF THE INVENTION

Many pulverulent materials are so fine as to act in many ways similar to a liquid. If such fine material is sought to be conveyed by a vibratory conveyor, only a small portion is actually transported, the balance acting in a manner similar to the action of a body of liquid such as water. Such very fine material is encountered in many processes, an example of which is the process for removing sulphur and ash from solvent refined coal. In such processes, the sulphur and ash is separated from the coal and consists of very fine particles, all of which is less than 50 microns in diameter, and at least half of which is less than 5 microns in diameter. In processes producing solvent refined coal, the ash and sulphur is separated from the coal at a temperature in the neightborhood of 500° F.–550° F., too hot to be conveyed by a belt conveyor, and because the material fluidizes, i.e., acts like a fluid, it cannot be conveyed by a vibratory conveyor.

SUMMARY OF THE INVENTION

In accordance with the present invention, there is provided a method for conveying very fine material of very fine particle size, which consists of forming a bed of larger size material of the order of 1/16 inch or larger in diameter on a vibratory conveyor, the bed being several inches deep, and then introducing the very fine material into the bed. The vibratory conveying action of the conveyor causes the very fine particles to filter down through the bed of larger material filling the interstices, which act as pockets carrying the fine material from the point of delivery to the conveyor to the discharge of the conveyor. The larger material is, of course, easily conveyed by a vibratory conveyor, and at the discharge end means are provided for separating the larger material from the fine particles so that the former may be recirculated to again form the bed and the latter is carried off. To provide cooling, the particulate material is cooled as, for example, by a water bath, and when reintroduced to the bed, serves to cool the fine material.

BRIEF DESCRIPTION OF THE DRAWINGS

FIG. 1 is a side elevational view, partly broken away for clarity of illustration, of an apparatus embodying the invention; and FIG. 2 is a view like FIG. 1 of a modified form of the invention.

DESCRIPTION OF THE PREFERRED EMBODIMENT

Referring now to FIGS. 1 and 2 of the drawings, there is shown a vibratory conveyor 10 which may be of the general type shown in my U.S. Pat. No. 3,750,866. The conveyor includes a base 11, a trough 12 mounted on the base for vibratory conveying movement by a plurality of links 13, and a number of rubber shear springs (not shown) arranged in the manner described in my earlier patent noted above. Mounted on the base 11 is vibration generator 14 including a motor 15 drivingly connected by a belt 16 to a wheel 17 mounted on a shaft carrying an eccentric 18. The crank arm 19 is rotatably mounted on the eccentric and is connected to the trough 12 as shown. Means in the form of a belt conveyor 20 are provided to form a bed of particulate material of relatively large diameter. In FIG. 1, the particulate material is shown as particles of limestone having a diameter of the order of 0.25 inches. In FIG. 2, the particulate material is shown as steel shot having, for the purposes of illustration, a diameter of the order of 1/16 inch. Particulate material as small as 50 mesh may be used in the process, if desirable.

A bed 21 of the particulate material having a depth of several inches is formed on the material-carrying surface 22 of the trough 12. Means generally illustrated at 23 are provided for introducing the fine particles onto the bed 21. As noted earlier, the fine particles consist of particles 100 percent of which have a diameter of less than 50 microns and 50 percent of which have a diameter of less than 5 microns. Particles of that degree of fineness are often referred to as fluidized solid material.

Operation of the vibration generator causes the conveyor 10 to convey the bed of material from a loading end 24 to a discharge end 25 of the trough 12. Simultaneously, the vibratory action of the trough causes the fine particles to sift down through the bed 21 of the coarser material where it is entrapped in the interstices of the material and thus is conveyed therewith.

Adjacent the discharge end 25 of the trough is a separating apparatus consisting of a screening means 26 over which the bed of coarser material and fine particles is directed. The screen may be of the vibratory type so that the fine particles pass down through the screen onto a belt conveyor 27, which conveys the fine particles to a desired location. The coarser material passes across the screen 26 onto a conveyor 28 which recirculates the coarser material back to the conveyor 20 for reintroduction onto the surface of the trough 12 to form the bed of conveying material.

Referring specifically to FIG. 2, there is additionally provided in the recirculation system, a cooler 30, through which the particulate material passes before being reintroduced to the conveyor at the loading end 24. The cooler may be of various types, a water bath system being the most economical. The particulate material is heated by the hot (500° F.–550° F.) fine material and should be cooled down to about 80° F. in the cooler 30. If the particulate material is steel shot, cooling the shot to 80° F. will, in the process, cool the fine material to about 150° F. by the time the discharge end 25 is reached. This is sufficiently cool to enable the fine material to be handled by conventional conveyors.

In use, particularly where cooling is to be achieved, about 100 tons of cooled shot is used per hour to cool and convey about 18 tons of the fine material. In addition, it has been found that the particulate material also serves to keep the inside walls and bottom of the trough clean. The scraping action of such material prevents a buildup of fine material which, in some cases, tends to cling tenaciously to the trough interior.

I claim:

1. The method for conveying fine particles by vibratory motion, wherein the particles are of a size which when subjected to vibratory conveying motion will fluidize rendering the particles substantially incapable of transport, which comprises providing a bed of particulate material of sufficient size as to be capable of being conveyed by vibratory motion, introducing the fine particles into said bed, subjecting the bed to vibratory conveying motion to cause the particles to flow into the interstices of the bed of material and be conveyed therewith.

2. The method for cooling and conveying hot fine particles by vibratory motion, wherein the particles are of a size which when subjected to vibratory conveying motion will fluidize rendering the particles substantially incapable of transport, which comprises providing a bed of cooled particulate material, said material being of sufficient size as to be capable of being conveyed by vibratory motion, introducing the hot fine particles into said bed, subjecting the bed to vibratory conveying motion to cause the particles to flow into the interstices of the bed of cool material to be cooled thereby and to be conveyed therewith to a point of discharge, separating the particles from the material at said point, recirculating the material to re-form the bed and cooling the material during the recirculation thereof.

3. The method for conveying particles of less than 50 microns in diameter by vibratory motion which comprises providing a bed of particulate material of more than 0.25 inches in diameter, introducing the particles into said bed, subjecting the bed to vibratory conveying motion to cause the particles to flow into the interstices of the bed of material and be conveyed therewith.

4. The method for conveying particles of less than 50 microns in diameter by vibratory motion which comprises providing a bed of steel shot, introducing the particles into said bed, subjecting the bed to vibratory conveying motion to cause the particles to flow into the interstices of the bed of material and be conveyed therewith.

5. The method for conveying particles of less than 50 microns in diameter by vibratory motion which comprises providing a bed of particulate material of more than 50 mesh in diameter, introducing the particles into said bed, subjecting the bed to vibratory conveying motion to cause the particles to flow into the interstices of the bed of material and be conveyed therewith.

6. In a solvent coal refining process, the method for cooling and conveying a hot ash and sulphur mixture resulting from the process, wherein said mixture is composed of particles of a size which when subjected to vibratory conveying motion will fluidize rendering the mixture substantially incapable of transport by such vibratory motion, which comprises providing a bed of cooled steel shot, introducing the hot ash and sulphur mixture into said bed, subjecting the bed to vibratory conveying motion to cause the ash and sulphur mixture to flow into the interstices in the shot to be cooled thereby and to be conveyed therewith to a point of discharge, separating the ash and sulphur mixture from the shot at said point, recirculating the shot to re-form the bed and cooling the shot during the recirculation thereof.

* * * * *